(12) United States Patent
Kondo et al.

(10) Patent No.: US 8,042,658 B2
(45) Date of Patent: Oct. 25, 2011

(54) SUSPENSION DEVICE

(75) Inventors: Takuhiro Kondo, Tokyo (JP); Hideshi Watanabe, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 360 days.

(21) Appl. No.: 12/444,646

(22) PCT Filed: Sep. 13, 2007

(86) PCT No.: PCT/JP2007/068329
§ 371 (c)(1),
(2), (4) Date: Apr. 7, 2009

(87) PCT Pub. No.: WO2008/044447
PCT Pub. Date: Apr. 17, 2008

(65) Prior Publication Data
US 2010/0065993 A1   Mar. 18, 2010

(30) Foreign Application Priority Data

Oct. 11, 2006   (JP) ................................ 2006-277503

(51) Int. Cl.
*F16F 15/03*   (2006.01)
(52) U.S. Cl. ......................................... 188/267; 267/34
(58) Field of Classification Search ............... 188/266.1, 188/266.2, 266.5, 267; 280/5.514, 5.515, 280/5.516, 124.108
See application file for complete search history.

(56) References Cited

U.S. PATENT DOCUMENTS

| | | | | |
|---|---|---|---|---|
| 4,815,575 A | * | 3/1989 | Murty | 188/266.1 |
| 5,027,048 A | | 6/1991 | Masrur et al. | |
| 5,060,959 A | * | 10/1991 | Davis et al. | 280/5.514 |
| 5,070,284 A | * | 12/1991 | Patil et al. | 318/362 |
| 5,350,983 A | | 9/1994 | Miller et al. | |
| 5,678,847 A | * | 10/1997 | Izawa et al. | 280/5.515 |
| 2005/0230201 A1 | * | 10/2005 | Kondou et al. | 188/267 |
| 2009/0095584 A1 | * | 4/2009 | Kondo et al. | 188/267 |
| 2009/0120745 A1 | * | 5/2009 | Kondo et al. | 188/267 |
| 2009/0321201 A1 | * | 12/2009 | Sakuta et al. | 188/290 |
| 2010/0025946 A1 | * | 2/2010 | Inoue et al. | 280/6.157 |
| 2010/0032912 A1 | * | 2/2010 | Inoue | 280/5.502 |
| 2010/0200343 A1 | * | 8/2010 | Kondo et al. | 188/267 |
| 2010/0207344 A1 | * | 8/2010 | Nakamura | 280/124.108 |
| 2011/0025000 A1 | * | 2/2011 | Inoue et al. | 280/5.507 |

FOREIGN PATENT DOCUMENTS

EP   0 363 158   4/1990
(Continued)

*Primary Examiner* — Christopher Schwartz
(74) *Attorney, Agent, or Firm* — McGlew and Tuttle, P.C.

(57) ABSTRACT

A suspension device (A) comprising a damper (S) and a gas spring (C), the damper (S) comprising a motion transforming mechanism (H) for transforming a relative motion between a vehicle body-side member and an axle-side member into a rotational motion and a motor (M) having a rotor (8) to which the rotational motion is transmitted, the gas spring (C) being interposed between the vehicle body-side member and the axle-side member, in which the motor (M) comprises a hollow casing (9), a partition wall member (16) which forms a rotor chamber (r) within the casing (9), with the rotor (8) being received within the rotor chamber (r), a cylindrical stator (17) disposed between an outer periphery of the partition wall member (16) and an inner periphery of the casing (9), and the rotor (8) held rotatably by the casing (9) within the rotor chamber (r), and the interior of the rotor chamber (6) is brought into communication with the interior of a gas chamber (R) of the gas spring (C). According to this construction, it is possible to avoid an increase in size of a suspension device utilizing a motor and with a gas spring applied thereto.

12 Claims, 5 Drawing Sheets

FOREIGN PATENT DOCUMENTS

| | | |
|---|---|---|
| EP | 0 604 028 A1 | 6/1994 |
| JP | 02-120113 | 5/1990 |
| JP | 8-197931 | 8/1996 |
| JP | 2005-140144 | 6/2005 |
| JP | 2006-038115 | 2/2006 |
| JP | 2006-177478 | 7/2006 |
| JP | 2006-327295 | 12/2006 |

* cited by examiner

SUSPENSION DEVICE

FIELD OF ART

The present invention relates to a suspension device.

BACKGROUND ART

A suspension device of this type, as is disclosed in Japanese Patent Laid-Open Publication No. Hei 08 (1996)-197931, is made up of a coil spring as a suspension spring which supports a vehicle body resiliently, a screw shaft engaged threadably and rotatably with a ball screw nut which is connected to an axle side, and a motor connected to one end of the screw shaft and also connected to the vehicle body side. With rotational torque generated by the motor, a relative movement between the vehicle body and the axle is controlled actively.

DISCLOSURE OF THE INVENTION

Generally, in a suspension device, a viewing direction of a driver of a vehicle changes when the height of the vehicle changes upon loading of goods onto the vehicle or due to an increase or decrease in the number of passengers on the vehicle; besides, during the night, when a centroidal position of the vehicles changes, the direction of light changes and so does the driving environment for the driver. Therefore, it is preferable that the vehicle height be constant independently of the weight of goods carried on the vehicle or the number of passengers on the vehicle. Further, as a result of the vehicle height being maintained constant, it becomes possible to make an appropriate vehicle attitude control.

Particularly, in the case of a large-sized vehicle, it is preferable that the vehicle height be lowered during stop of the vehicle so as to permit a passenger to get on the vehicle easily, while during travel of the vehicle the vehicle height be maintained constant for the above reason.

For adjusting the vehicle height with use of the suspension device disclosed in Japanese Patent Laid-Open Publication No. Hei 08 (1996)-197931, it is necessary to make the motor generate rotational torque constantly; that is, it is necessary that the weight of the vehicle body which the coil spring bears be borne by the motor.

As a result, since an electric current flows in the motor coil constantly, the coil itself generates heat. In the case where the temperature of the motor rises markedly due to the generation of heat of the coil, an insulating property deteriorates on account of, for example, a chemical change of an insulating film of a conductor which forms the coil, with a consequent leakage of electricity and fear of damage of the motor itself. There also is a fear that demagnetization of a magnet due to a rise in temperature of the motor may be generated.

Such a rise in temperature of the motor can be prevented by allowing a suspension spring to make vehicle height adjustment, etc. The use of a gas spring may be effective for this purpose.

However, the gas spring requires a gas chamber for sealing high-pressure gas therein, and it is necessary to ensure a certain volume of the gas chamber. Thus, in case of applying the gas spring to a suspension device using a motor, the suspension device becomes large-sized and is therefore inferior in its onboard-ability onto a vehicle.

The present invention has been accomplished in view of the above-mentioned drawbacks and it is an object of the present invention to provide a suspension device using a motor which can avoid an increase in size even with use of a gas spring.

According to the present invention, for achieving the above-mentioned object, there is provided a suspension device comprising a motion transforming mechanism for transforming a relative motion between a vehicle body-side member and an axle-side member into a rotational motion, a motor having a rotor to which the rotational motion is transmitted, and a gas spring interposed between the vehicle body-side member and the axle-side member, the motor comprising a hollow casing, a partition wall member which forms a rotor chamber within the casing, with the rotor being received within the rotor chamber, a cylindrical stator disposed between an outer periphery of the partition wall member and an inner periphery of the casing, and the rotor held rotatably by the casing within the rotor chamber, the interior of the rotor chamber being brought into communication with the interior of a gas chamber of the gas spring.

According to the suspension device of the present invention, since the interior of the rotor chamber formed within the motor is brought into communication with the gas chamber, it is not necessary to provide a seal at portions difficult to ensure an airtight state such as a rotating portion of an outer periphery of the rotor of the motor and lead wires as a wiring portion of the stator, etc., and it is possible to keep the motor compact even in case of using a gas spring.

Besides, since the interior of the rotor chamber formed within the motor is put in communication with the gas chamber, it is no longer required to use a seal for preventing the exertion of pressure on the interior of the motor at a rotating portion such as the outer periphery of the rotor of the motor and at a sliding portion such as between outer and inner tubes forming a cylindrical body of a damper.

Therefore, as the seal at the above wiring portion, it is not necessary to use a large-sized, special seal to withstand a high pressure, nor is it necessary to provide a large-sized seal at the sliding portion of the damper. Accordingly, it is possible to avoid an increase in both size and cost of the motor. Additionally, since an increase in both size and cost of the damper can be avoided, it is possible to avoid an increase in both size and cost of the entire suspension device.

BEST MODE FOR CARRYING OUT THE INVENTION

Figure 1:
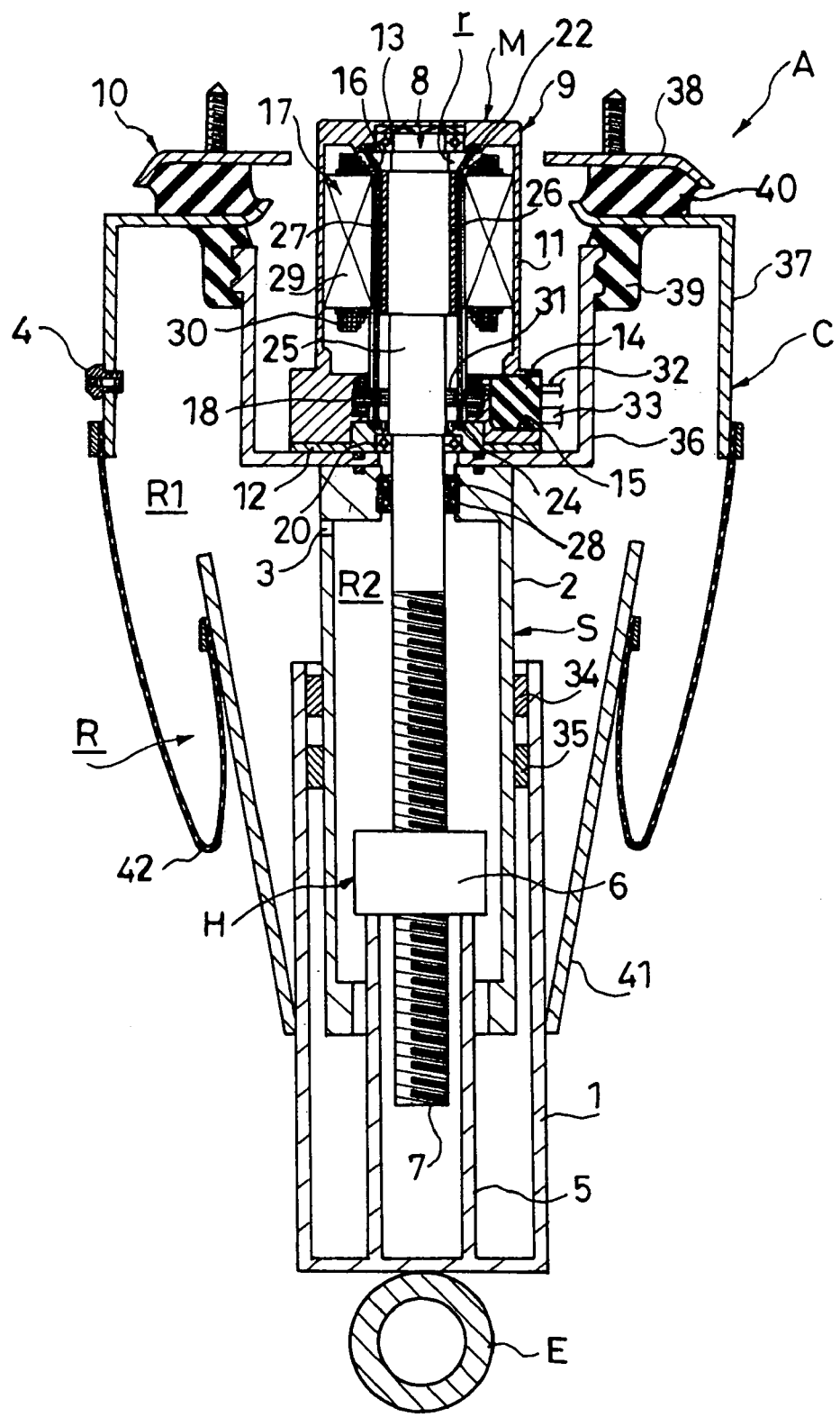
FIG. 1 is a vertical sectional view of a suspension device according to an embodiment of the present invention.

The present invention will be described below by way of embodiments thereof illustrated in the drawings.

As shown in FIG. 1, a suspension device A according to an embodiment of the present invention is made up of a damper S and a gas spring C interposed between a vehicle body-side member and an axle-side member, the damper S including a motion transforming mechanism H for transforming a relative motion between the vehicle body-side member and the axle-side member in a vehicle (not shown) into a rotational motion, and a motor M having a rotor to which the rotational motion is transmitted.

In the suspension device A, as shown in FIG. 1, the gas spring C includes a gas chamber R, the gas chamber R being made up of a cylindrical outer chamber R1 disposed on an outer periphery side of the damper S and a cylindrical inner chamber R2 defined by an outer tube 1 and an inner tube 2 both forming a cylindrical body of the damper S. The gas chamber R is brought into communication with the interior of a rotor chamber r which is formed within the motor M. The interior of the motor M also constitutes a part of a gas-sealed volume of the gas spring C.

The interior of the gas chamber R and that of the rotor chamber r in the gas spring C are connected through a valve 4 to a gas supply/discharge source such as a gas tank (not shown) mounted on the vehicle, the valve 4 being installed in a chamber member 37 which is one of constituent members of the outer chamber R1 of the gas spring C. With this arrangement, it is possible to change the spring constant of the gas spring C and also possible to supply gas positively into the gas spring C to adjust the vehicle height.

The damper S is made up of a bottomed, cylindrical outer tube 1, an inner tube 2 which is inserted into the outer tube 1 slidably through annular bearings 34 and 35, a ball screw nut 6 as a screw nut provided at an upper end in FIG. 1 of a connecting tube 5, the connecting tube 5 rising from an inside bottom of the outer tube 1 and being inserted into the inner tube 2, a screw shaft 7 threadably engaged with the interior of the ball screw nut 6 rotatably and held rotatably by a bearing 28 which is mounted on an inner periphery of an upper portion of the inner tube 2, and the motor M which is connected to an upper end in FIG. 1 of the inner tube 2. A rotor 8 of the motor M and the screw shaft 7 are connected with each other so that a linear motion of the ball screw nut 6, which is performed with extension or retraction of the damper S, can be transformed into a rotational motion of the screw shaft 7 and so that the rotational motion of the screw shaft 7 can be transmitted to the rotor 8.

According to this embodiment, in the damper S, the outer tube 1 is connected to an axle-side member of the vehicle through an eye E which is provided at a lower end in FIG. 1 of the outer tube 1, while the inner tube 2 is connected to a vehicle body-side member through a mount 10 which is connected to an outer periphery of an upper end of the inner tube.

Thus, in this embodiment, the motion transforming mechanism H is made up of the screw shaft 7 and the ball screw nut 6. When the ball screw nut 6 performs a linear motion vertically in FIG. 1 with respect to the screw shaft 7, the screw shaft 7 is rotated forcibly since a rotational motion of the ball screw nut 6 is inhibited through the connecting tube 5 by the outer tube 1 which is fixed to the axle-side member. Conversely, when the screw shaft 7 is rotated by driving the motor M, the ball screw nut 6 can be moved vertically since the rotation of the ball screw nut 6 is inhibited.

By supplying an electric current positively to the motor M and causing torque to be generated in the direction opposite to the rotational direction of the screw shaft 7, not only a rotational motion of the screw shaft 7 can be suppressed, but also the screw shaft 7 can be rotated, so that it is possible to control the linear motion of the ball screw nut 6. Thus, the motor M functions as an actuator capable of controlling a relative linear motion between the outer tube 1 and the inner tube 2 and hence the suspension device A can function as an active suspension.

Moreover, as a result of the rotor 8 being rotated forcibly with the rotational motion of the screw shaft 7, a regenerative current flows in the motor M and an electromagnetic force is generated. With this electromagnetic force, torque which resists the rotation of the screw shaft 7 is imparted to the shaft, whereby the rotational motion of the screw shaft 7 can be suppressed. Thus, the suspension device A functions also as a passive suspension.

The connecting tube 5 need not always be formed in a tubular shape insofar as the connecting tube 5 can connect the ball screw nut 6 to the outer tube 1 in the rotation-inhibited state of the nut.

Since the bearings 34 and 35 are provided between the outer tube 1 and the inner tube 2, an axial eccentricity of the inner tube 2 with respect to the outer tube 1 is prevented and eventually an axial eccentricity of the screw shaft 7 with respect to the ball screw nut 6 is prevented, whereby a concentrated loading on a portion of balls (not shown) in the ball screw nut 6 can be prevented and hence it is possible to avoid damage of the balls or grooves (not given reference numerals) of the screw shaft 7.

Besides, since it is possible to prevent damage of the balls or grooves of the screw shaft 7, both rotation of the screw shaft 7 with respect to the ball screw nut 6 and movement thereof in the extending/retracting direction of the damper S can be done always in a smooth manner. Consequently, the function as the damper S is not impaired and hence it is possible to improve the practicability of the damper S.

Further, in this embodiment, although the motion transforming mechanism H is made up of the ball screw nut 6 and the screw shaft 7, it may be of another construction. For example, the mechanism may be constituted by a rack and pinion. Also, the ball screw nut may be replaced by a mere nut.

Figure 2:
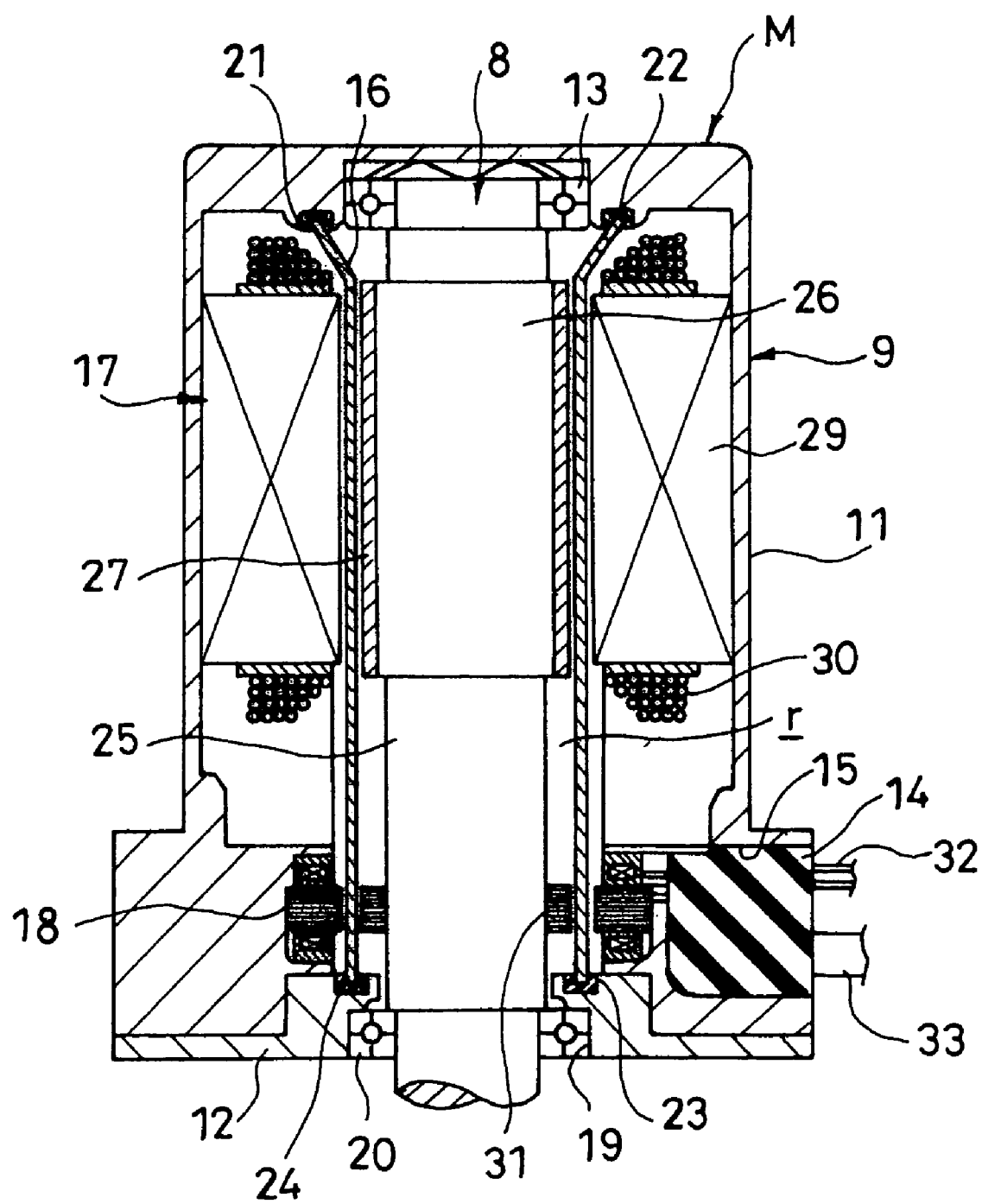
FIG. 2 is an enlarged, vertical sectional view of a motor used in the suspension device of the embodiment.

As shown in FIGS. 1 and 2, the motor M includes a hollow casing 9 connected to the upper end in the figures of the inner tube 2, a partition wall member 16 which defines within the casing 9 a rotor chamber r for receiving the rotor 8 therein, and a cylindrical stator 17 disposed between an outer periphery of the partition wall member 16 and an inner periphery of the casing 9.

More specifically, the casing 9 includes a cylindrical casing body 11 having a closed top in FIG. 1 and a base 12 which closes an opening of the casing body 11.

A bearing 13 which holds an upper portion of the rotor 8 rotatably is fixed to a lower end side of the top portion of the casing body 11, while in a lower portion in FIG. 1 of the casing body 11, there is formed an aperture 15 for holding a grommet 14.

At a lower end of a top portion of the casing 9 and on the outer periphery side with respect to the bearing 13, there is formed an annular groove 21, with a sealing member 22 being inserted into the annular groove 21.

On the other hand, the base 12 is formed with a hole 19 which permits the rotor 8 to be inserted therethrough, and a bearing 20 is fitted in an inner periphery of the hole 19 to hold a lower portion of the rotor 8 rotatably. Further, an annular groove 23 is formed at an upper end of the base 12 and on an outer periphery side of the hole 19, with a sealing member 24 being inserted into the annular groove 23.

In the interior of the casing 9 thus formed, there are formed, with the cylindrical partition wall member 16, the rotor chamber r for receiving the rotor 8 therein on an inner periphery side of the partition wall member 16 and a space for receiving the stator 17 therein between the outer periphery of the partition wall member 16 and the inner periphery of the casing 9. Both upper and lower ends of the partition wall member 16 press the sealing members 22 and 24, respectively, to seal between the partition wall member 16 and the casing 9 and thus the rotor chamber r and the space with the stator 17 received therein are isolated from each other in an airtight manner.

The partition wall member 16 is formed of a non-magnetic material such as synthetic resin, rubber, or stainless steel so as not to exert any influence on the magnetic circuit of the motor M.

The rotor 8 includes a shaft 25 and a magnet 27 which is mounted on an outer periphery of the shaft through a cylindrical yoke 26. An upper end of the shaft 25 is supported by an inner periphery of the bearing 13, while a lower end thereof is supported by an inner periphery of the bearing 20 and is connected to the screw shaft 7.

The stator 17 received within the space between the casing 9 and the partition wall member 16 includes a core 29 as an armature core opposed to the magnet 27 of the rotor 8 and a coil 30 fitted on the core 29. Thus, the motor M is constituted as a so-called brushless motor. In this embodiment, there may be adopted a motor of such a structure as makes a stator an armature.

The magnet 27 is formed in an annular shape, having a divided pole pattern with N and S poles appearing alternately along a circumference. However, plural magnets may be connected in an annular shape, for example by bonding each other.

Sensor means 18 for detecting the position of the rotor 8 is accommodated and fixed within the space between the casing 9 and the partition wall member 16 at a position lower than the stator 17. In this embodiment, the sensor means 18 is made a resolver stator opposed to a resolver core 31 which is provided on an outer periphery of a lower portion of the shaft 25 of the rotor 8. A lead wire 32 for the supply of an electric current to the resolver stator as the sensor means 18 and for the transfer of a detection signal, as well as a lead wire 33 for the supply of an electric current to the coil 30 of the stator 17 are extended through the grommet 14 and is drawn out to the exterior of the motor M, then is connected to a control unit (not shown) which is for controlling the suspension device A.

Thus, the stator 17 and the sensor means 18 both accommodated within the space between the casing 9 of the motor M and the partition wall member 16 are isolated from the rotor chamber r so that the pressure of the gas chamber R is not exerted on the space.

The sensor means 18 for detecting the position of the rotor 8 is not limited to the above resolver. It may be a magnetic sensor such as a Hall element.

The motor M is accommodated within a mount inner tube 36 of the mount 10 and is connected to the upper end of the inner tube 2. The mount 10 includes the mount inner tube 36, a cylindrical chamber member 37 which has a flange on an inner periphery side of an upper end thereof in FIG. 1 and which forms a chamber portion of the gas spring C, an annular plate 38 connected to a vehicle body-side member (not shown) of the vehicle, vibration isolating rubber 39 which connects the mount inner tube 36 and the chamber member 37 with each other, and vibration isolating member 40 which connects the chamber member 37 and the plate 38 with each other.

The gas spring C includes the outer chamber R1 and the inner chamber R2 which is formed by both outer tube 1 and inner tube 2 of the damper S, the outer chamber R1 being made up of the chamber member 37 which forms a part of the mount 10, an air piston 41 of a generally hollow cone shape which is disposed so as to cover the outer tube 1, with a base end thereof being connected to an outer periphery of the outer tube 1, and a diaphragm 42 which is fixed to both a lower end in FIG. 1 of the chamber member 37 and an upper end in FIG. 1 of the air piston 41. The outer chamber R1 and the inner chamber R2 are put in communication with each other through a hole 3 formed in a side portion of the upper end of the inner tube 2. The inner chamber R2 is brought into communication through the interiors of bearings 20 and 28 with the interior of the rotor chamber r formed in the motor M.

Therefore, as described above, the rotor chamber r formed in the motor M functions as a part of the gas chamber R in the gas spring C, thus contributing to the volume of the gas spring.

Although the hole 3 formed in the inner tube 2 is utilized for the communication between the outer chamber R1 and the inner chamber R2, it may be substituted by a hole formed in the side portion of the outer tube 1 at a position facing the outer chamber R1. Further, a hole or a passage may be formed in another position and be utilized for the communication if only it can provide a communication between the outer chamber R1 and the inner chamber R2 without causing any functional problem of the suspension device A.

The valve 4 is mounted at the side portion of the chamber member 37, so that gas can be supplied into and discharged from the gas chamber R through the valve 4.

As is seen from the above description, the gas pressure in the gas chamber R acts also on the interior of the rotor chamber r of the motor M. However, even with this construction, since the exertion of the gas pressure on the stator 17 and the sensor means 18 is prevented by the partition wall member 16, there is no fear of a high pressure being exerted on the lead wires 32 and 33 as wiring portions of the stator 17 and the sensor means 18.

That is, in the suspension device A, since the interior of the rotor chamber r formed within the motor M is put in communication with the gas chamber R, it is not necessary to provide a seal at portions involving difficulty in maintaining an airtight condition such as the rotating portion of the outer periphery of the rotor 8 of the motor M and the lead wires 32 and 33 which are wiring portions of the stator 17 and the sensor means 18. Thus, the motor M can be kept compact even in case of using the gas spring C.

As described above, although the suspension device A frequently extends and retracts during travel of the vehicle, since the interior of the rotor chamber r formed within the motor M is brought into communication with the gas chamber R, the use of a seal for preventing the action of pressure on the interior of the motor M can be avoided at the rotating portion such as the outer periphery of the rotor 8 of the motor M or at a sliding portion between the outer tube 1 and the inner tube 2. In case of sealing the sliding portion, there is used a large-sized seal for high pressure since the internal pressure of the damper which utilizes a motor becomes equal to the atmospheric pressure. In the suspension device A, however, it is not necessary to use such a large-sized seal, since the interior of the rotor chamber r formed within the motor M is in communication with the gas chamber R.

Therefore, as to the grommet 14 which functions as a seal at the above wiring portion, it is not necessary to use a large-sized special seal to withstand a high pressure. Besides, since it becomes unnecessary to provide a large-sized seal at the sliding portion of the damper S, it is possible to avoid an increase in both size and cost of the motor accordingly and also possible to avoid an increase in both size and cost of the whole of the damper S. Consequently, it is possible to avoid an increase in both size and cost of the whole of the suspension device A.

Moreover, since the interior of the rotor chamber r formed within the motor M is brought into communication with the gas chamber R, a required volume of the gas spring C can be ensured within the outer tube 1 and the inner tube 2 both forming the cylindrical body of the damper S. Accordingly, it is possible to further save the space for the entire suspension device A and eventually possible to equalize the size of the entire suspension device A to that of a hydraulic suspension device comprising a hydraulic damper and a gas spring provided on the outer periphery of the hydraulic damper.

Further, since a required volume of the gas spring C can be ensured within the outer tube 1 and the inner tube 2 both forming the cylindrical body of the damper S, the problem of a deficient volume does not arise even when the motor M is disposed on the inner periphery side of the outer chamber R1 in the gas spring C as in this embodiment. Consequently, it becomes possible to shorten the overall length of the suspension device A with the gas spring C formed thereon.

As described above, moreover, although the suspension device A frequently extends and retracts during travel of the vehicle, since the interior of the rotor chamber r formed within the motor M is put in communication with the gas chamber R, the use of a seal for preventing the action of pressure on the interior of the motor M can be avoided at the rotating portion such as the outer periphery of the rotor 8 of the motor M and also at the sliding portion between the outer tube 1 and the inner tube 2. Thus, there is no fear of the extending/retracting motion of the suspension device A being obstructed by a sliding resistance induced by such a seal, whereby the ride comfort on the vehicle is improved. Besides, since there is no need of sealing a portion apt to be deteriorated, the suspension device A can exhibit a stable function over a long period and hence the reliability thereof is improved.

The following description is now provided about the operation of the suspension device A which is constructed as above.

First, a description will be given about the function of the damper S in the suspension device A. When the damper S extends or retracts, that is, when the inner tube 2 moves up or down in FIG. 1 with respect to the outer tube 1, an upward or downward linear motion of the ball screw nut 6 connected to the outer tube 1 is transformed into a rotational motion of the screw shaft 7 by the ball screw mechanism comprising the ball screw nut 6 and the screw shaft 7, and the shaft 25 of the motor M connected to the screw shaft 7 rotates as well.

With the rotational motion of the shaft 25 of the motor M, the coil 30 in the motor M passes across the magnetic field of the magnet 27 and an induced electromotive force is generated, so that torque by an electromagnetic force caused by the induced electromotive force acts on the shaft 25 of the motor M and suppresses the rotational motion of the shaft 25.

The action of suppressing the rotational motion of the shaft 25 results in suppressing the rotational motion of the screw shaft 7, which in turn acts to suppress the linear motion of the ball screw nut 6. In this case, with the above electromagnetic force, the damper S generates a control force acting as a damping force to absorb and cushion the vibration energy.

In case of supplying an electric current to the coil 30 positively, since the extension and retraction of the damper S can be controlled freely, that is, can be controlled freely in the range in which a control force for the damper S can be generated, by adjusting the torque acting on the shaft 25, it is possible to make the damping characteristics (characteristics of the damping force against the extension or retraction speed) variable or make the damper S function as an actuator.

On the other hand, as to the gas spring C, the amount of gas present within the gas spring C is kept constant in a normal state, supporting the vehicle body resiliently and cushioning the transfer of a shock from a road surface to the vehicle body.

Thus, the suspension device A not only fulfills the function as a conventional passive suspension device but also can function as a semi-active or active suspension.

Moreover, since the suspension device A is provided with the gas spring C, the vehicle height can be adjusted by controlling the internal pressure of the gas chamber R in the gas spring C. In adjusting the vehicle height, it is not necessary to maintain the state in which torque is generated in the motor M, so that there no longer is a fear of various problems being caused by the generation of heat in the coil 30, such as deterioration of an insulating property due to a chemical change of an insulating film of the conductor which forms the coil 30 and the occurrence of demagnetization of the magnet 27 due to a rise in temperature of the motor M.

A description will now be given about various modifications of the structure in which the rotor chamber r is formed within the motor M. In the following description, in order to avoid duplicated descriptions, the same members as in the above embodiment will be merely identified by the same reference numerals as in the above embodiment and detailed descriptions thereof will be omitted.

Figure 3:
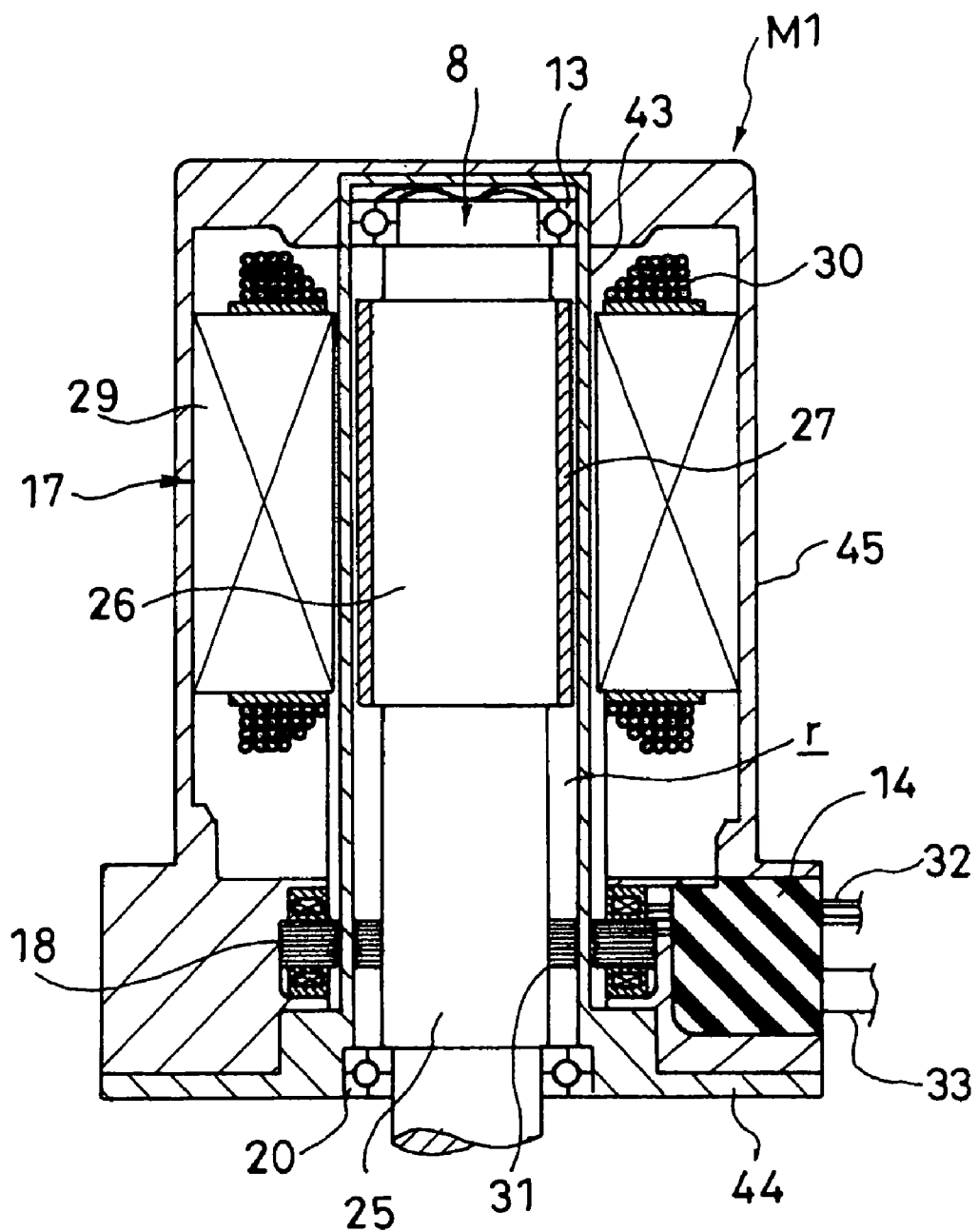
FIG. 3 is an enlarged, vertical sectional view of a motor used in a suspension device according to a modification of the embodiment.

In the motor M according to the above embodiment, the bearing 13 is fixed to the top of the casing body 11, while in a motor M1 used in a suspension device according to a modification of the above embodiment, a partition wall member 43 is formed in a cylindrical shape having a closed top, with a bearing 13 being fitted in the interior of an upper end of the partition wall member 43, as shown in FIG. 3. Further, a flange 44 is formed on an outer periphery of a lower end of the partition wall member 43 and thus the partition wall member 43 also serves as the base 12 referred to above in connection with the motor M in the above embodiment.

The structure of the casing body 45 in the motor M1 is approximately the same as the structure of the casing body 11 in the above embodiment except that the bearing 13 is not directly fixed to the top, as described above. In the case of the motor M1 according to this modification, if the rotor 8 is previously installed into the partition wall member 43 to provide a rotor assembly, then by installing this rotor assembly into the stator of a motor of a conventional structure there is formed the rotor chamber r. Thus, there is provided an advantage in both workability and versatility. Besides, it is not necessary to provide a sealing member between the casing body 45 and the partition wall member 43, whereby the number of parts is reduced. The function and effect of this suspension device are the same as those of the suspension device A of the above embodiment.

Figure 4:
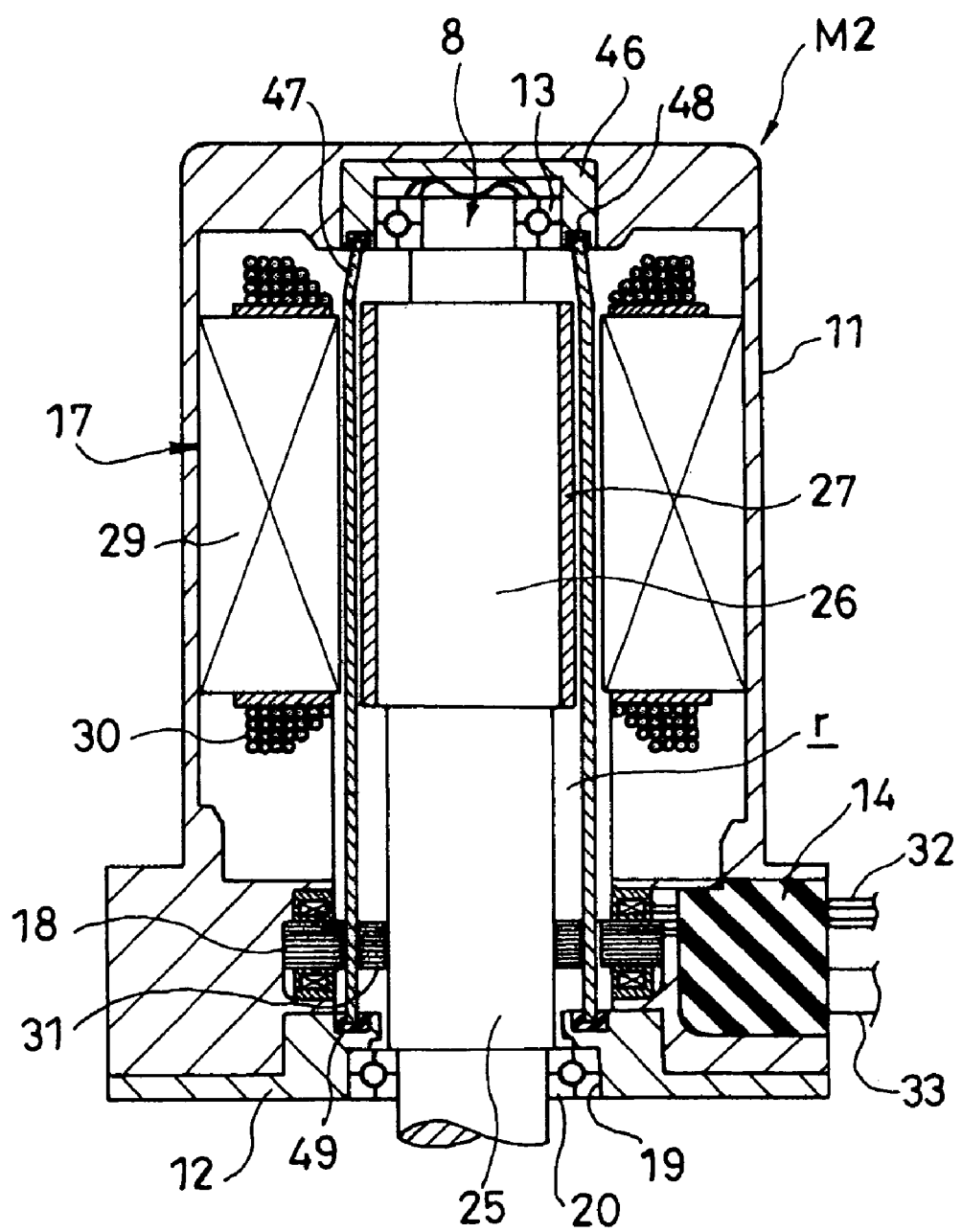
FIG. 4 is an enlarged, vertical sectional view of a motor used in a suspension device according to another modification of the embodiment.

In the motor M according to the above embodiment, the bearing 13 is fixed to the top of the casing body 11, while in a motor M2 according to another modification, as shown in FIG. 4, a pan-like bearing holding member 46 for holding the bearing 13 can be inserted into the top of the casing body 11, a partition wall member 47 is formed in a cylindrical shape, an annular sealing member 48 is disposed between the partition wall member 47 and the bearing holding member 46, and a sealing member 49 is disposed between the partition wall member 47 and the base 12, whereby a rotor chamber r is formed within the motor M2.

Further, the structure of the motor M2 according to this modification brings about the following advantage. The bearing holding member 46, the partition wall member 47, the base 12 and the sealing members 48, 49 can be installed mainly on the rotor 8 side to provide a rotor assembly. Therefore, like the motor M1 of the above first modification, the rotor assembly can be easily installed on the stator side of a motor of a conventional structure and thus there is provided an advantage in point of versatility.

Figure 5:
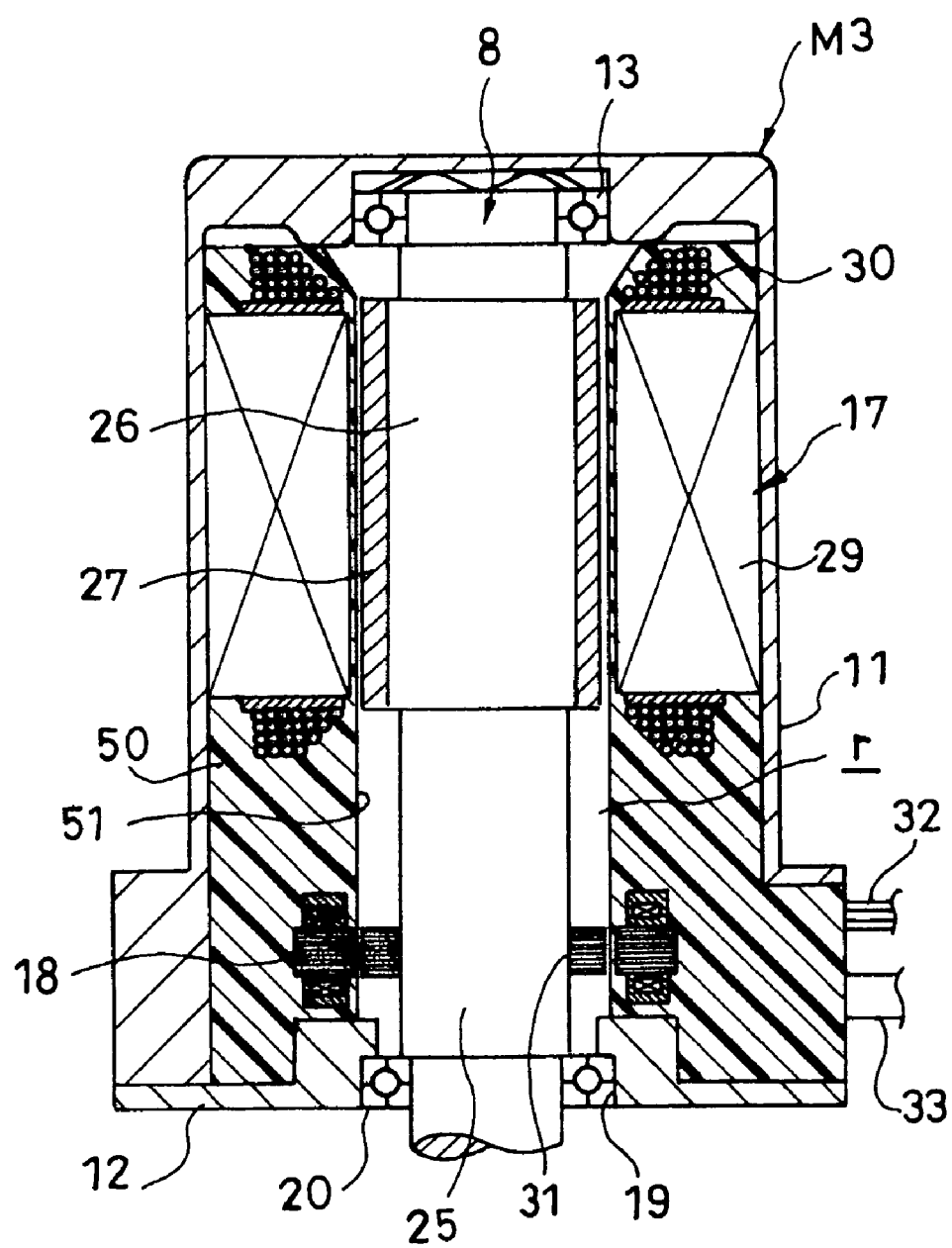
FIG. 5 is an enlarged, vertical sectional view of a motor used in a suspension device according to a further modification of the embodiment.

Further, the motor M according to the above embodiment is provided with the partition wall member 16, while in a motor M3 according to a further modification, as shown in FIG. 5, the stator 17 and the sensor means 18 are made integral with each other beforehand by molding with resin, then are fixed in such an integral state to the inner periphery of the casing body 11, and the molding resin 50 itself is utilized as a partition wall member, thereby forming a rotor chamber r within the motor M3.

Since the rotor chamber r is thus formed, it is not necessary to specially provide a partition wall member as a separate member and install it into the motor M3 and hence the structure of the motor M3 is simplified to a great extent, so that the workability is improved. Moreover, since lead wires 32 and 33 for the supply of an electric current to the stator 17 and the sensor means 18 can also be rendered integral with each other using the molding resin 50, the formation of the rotor chamber r is further ensured.

In case of molding the whole of the stator 17 with resin, even in the case of a motor with brush, a lead wire connected to the brush is also received within the molding resin 50, whereby the rotor chamber r can be maintained in an airtight state. Thus, there is provided an advantage that a motor with brush can also be adopted as a damping force generation source for the suspension device. That is, in the modification being considered, it is possible to adopt a motor having the structure with the use of a rotor as an armature.

In this modification, using rubber or a resin material, a film 51 is formed on an outer surface of the molding resin 50. There can be a case where small holes are formed in the molding resin 50, that is, small holes communicating with the stator 17 and the sensor means 18 are formed in the molding resin 50, resulting in that the high pressure in the rotor chamber r acts directly on the stator 17 and the sensor means 18. With the film 51, even when small holes are formed in the molding resin 50, the rotor chamber r can be maintained in an airtight state and it is surely prevent a direct exertion of the internal high pressure of the rotor chamber r on the stator 17 and the sensor means 18.

Although, in the above embodiment and modifications, the rotor 8 of each of the motors M, M1, M2 and M3 is connected to the screw shaft 7, there may be adopted a construction in which the rotor 8 is connected to the ball screw nut 6, the screw shaft 7 is connected to the outer tube 1, and the ball screw nut 6 is rotated to make the screw shaft 7 perform a linear motion. In this case, it is preferable that the rotor 8 be made hollow to permit a certain insertion of the screw shaft 7 into the motors M, M1, M2 and M3, thereby ensuring a required stroke length of the suspension device A. There also may be adopted a construction in which the magnet 27 is attached directly to the outer periphery of the ball screw nut 6 to constitute a rotor although the motors M, M1, M2 and M3 become somewhat larger in size.

The present invention has been described above by way of an embodiment and modifications thereof, but it goes without saying that the scope of the present invention is not limited to the details illustrated in the drawings or described above.

INDUSTRIAL APPLICABILITY

The suspension device of the present invention is applicable to a vehicular suspension.

The invention claimed is:

1. A suspension device comprising:
   a damper, the damper comprising a motion transforming mechanism for transforming a relative motion between a vehicle body-side member and an axle-side member into a rotational motion and a motor having a rotor to which said rotational motion is transmitted; and
   a gas spring interposed between the vehicle body-side member and the axle-side member,
   the motor comprising:
   a hollow casing;
   a partition wall member which forms a rotor chamber within the casing, with the rotor being received within the rotor chamber;
   a cylindrical stator disposed between an outer periphery of the partition wall member and an inner periphery of the casing; and
   the rotor held rotatably by the casing within the rotor chamber,
   the interior of the rotor chamber being brought into communication with the interior of a gas chamber of the gas spring.

2. The suspension device according to claim 1, wherein the gas chamber of the gas spring comprises an outer chamber, the outer chamber being formed in a cylindrical shape and disposed so as to cover an outer periphery of the damper, and an inner chamber, the inner chamber being formed within a cylindrical body which receives the motion transforming mechanism therein.

3. The suspension device according to claim 2, wherein the partition wall member is a molding resin which covers the stator.

4. The suspension device according to claim 2, wherein the partition wall member is formed in a cylindrical shape and a sealing member is interposed between both ends of the partition wall member and the casing.

5. The suspension device according to claim 2, wherein a magnetic sensor or a resolver stator is disposed between the outer periphery of the partition wall member and the inner periphery of the casing to detect the position of the rotor.

6. The suspension device according to claim 1, wherein the partition wall member is a molding resin which covers the stator.

7. The suspension device according to claim 6, wherein a surface of the molding resin is covered with a rubber film layer.

8. The suspension device according to claim 7, wherein a magnetic sensor or a resolver stator is disposed between the outer periphery of the partition wall member and the inner periphery of the casing to detect the position of the rotor.

9. The suspension device according to claim 6, wherein a magnetic sensor or a resolver stator is disposed between the outer periphery of the partition wall member and the inner periphery of the casing to detect the position of the rotor.

10. The suspension device according to claim 1, wherein the partition wall member is formed in a cylindrical shape and a sealing member is interposed between both ends of the partition wall member and the casing.

11. The suspension device according to claim 10, wherein a magnetic sensor or a resolver stator is disposed between the outer periphery of the partition wall member and the inner periphery of the casing to detect the position of the rotor.

12. The suspension device according to claim 1, wherein a magnetic sensor or a resolver stator is disposed between the outer periphery of the partition wall member and the inner periphery of the casing to detect the position of the rotor.

* * * * *